(12) United States Patent  
Anderberg

(10) Patent No.: US 7,484,734 B2  
(45) Date of Patent: Feb. 3, 2009

(54) PRESSURE RESISTANT STATIC AND DYNAMIC EXPELLER SHAFT SEALING

(75) Inventor: Göran Anderberg, Landskrona (SE)

(73) Assignee: Huhnseal AB, Landskrona (SE)

( * ) Notice: Subject to any disclaimer, the term of this patent is extended or adjusted under 35 U.S.C. 154(b) by 193 days.

(21) Appl. No.: 11/303,064

(22) Filed: Dec. 13, 2005

(65) Prior Publication Data

US 2006/0091612 A1    May 4, 2006

Related U.S. Application Data

(63) Continuation-in-part of application No. PCT/SE2004/000924, filed on Jun. 14, 2004.

(51) Int. Cl.
*F16J 15/16* (2006.01)
*F16J 15/42* (2006.01)

(52) U.S. Cl. .................. 277/433; 277/306; 277/423; 277/425

(58) Field of Classification Search ......... 277/423–425, 277/433, 305, 422, 580
See application file for complete search history.

(56) References Cited

U.S. PATENT DOCUMENTS

| | | | |
|---|---|---|---|
| 2,494,971 A * | 1/1950 | Summers | 277/425 |
| 2,894,769 A * | 7/1959 | Richmond et al. | 277/362 |
| 3,042,417 A | 7/1962 | Derman et al. | |
| 3,256,027 A | 6/1966 | Chapel | |
| 4,428,587 A | 1/1984 | Forch | |
| 5,069,461 A * | 12/1991 | Orlowski | 277/303 |
| 5,078,410 A * | 1/1992 | Warman et al. | 277/433 |
| 5,221,095 A | 6/1993 | Orlowski | |
| 5,378,000 A * | 1/1995 | Orlowski | 277/311 |
| 2007/0296157 A1 * | 12/2007 | Roddis | 277/411 |
| 2008/0014076 A1 * | 1/2008 | Roddis et al. | 415/174.2 |

* cited by examiner

*Primary Examiner*—Alison K Pickard  
(74) *Attorney, Agent, or Firm*—Larson & Larson Herbert

(57) ABSTRACT

A shaft sealing assembly for static and dynamic axial sealing of a centrally located rotating and movable shaft is provided. The assembly includes at least one first sealing member for sealing said shaft, at least one rotor member-attached to said shaft, and a stator member attached to a housing. A first sealing member is arranged in a recess in said rotor member effectively sealing one side of the assembly from its other side when a pressure difference exists between the media on the two sides of the assembly. Upon rotation of the shaft, the static sealing member is centrifugally moved axially and radially away from its static sealing position and friction between the sealing member and the stator is eliminated. Dynamic sealing is affected by a pressure difference caused by a turbine effect of the rotor member.

24 Claims, 7 Drawing Sheets

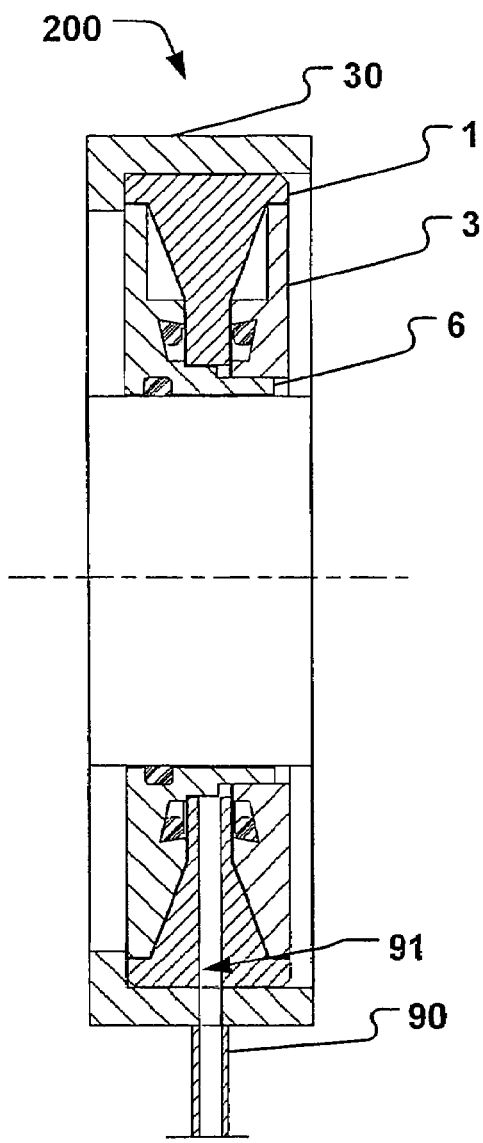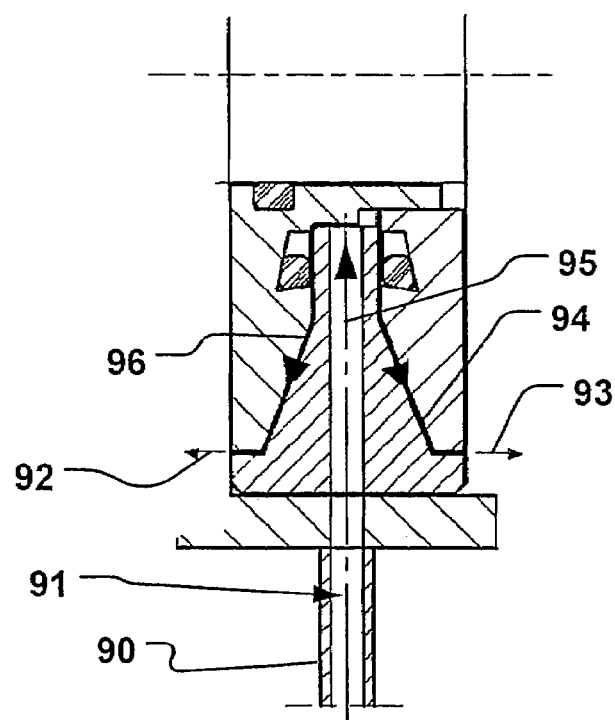
Fig. 9     Fig. 10

PRESSURE RESISTANT STATIC AND DYNAMIC EXPELLER SHAFT SEALING

PRIOR APPLICATIONS

This application is a continuation-in-part of international application S.N. PCT/SE2004/000924, filed on Jun. 14, 2004, which in turn bases priority on Swedish application S.N. 0301749-8, filed on Jun. 16, 2003, and U.S. Provision application Ser. No. 60/479,870, filed on Jun. 20, 2003.

BACKGROUND OF THE INVENTION

1. Field of Invention

This invention pertains in general to the field of shaft sealing devices, and more particularly to a static and dynamic shaft sealing arrangement. Even more particularly, the present invention pertains to an expeller shaft sealing, which effectively seals statically when a shaft is at rest and which effectively seals dynamically when the shaft is rotating, as well as during transitions between static and dynamic operation. A sealing arrangement changes configuration so as to seal effectively statically by means of a mechanical contact at a sealing surface and without friction when the shaft is rotating, and whereby the sealing arrangement provides a good sealing effect even for a differential pressure in the surrounding media, such as liquid, gas or dust, between both sides of the sealing arrangement both in the static and dynamic operation.

2. Description of the Prior Art

Today, lip seals are mainly used for isolating bearings in rotating equipment. The seals and bearings account for a large number of rotating equipment failures and there is a close relationship between the lives of these two critical components. The failure of such a seal may cause the bearings to fail and poor bearing conditions can reduce seal life. Rain, product leakage, debris, and wash-down water entering the bearing housing contaminate the bearing lubricant and have a devastating effect on the product lifetime of the bearing. Very small amounts of water or other contaminants can shorten bearing life considerably.

Auxiliary mechanical equipment shaft sealing devices, sometimes called bearing isolators or sealing rings, are used for equipment, which is intended to operate in hostile applications, in which the equipment is exposed to potential contaminants as dust for instance. Elastomeric shaft seals thus quickly wear out and fail in such hostile environments. Dust and other exterior contaminants cannot be excluded from the interior of a sealed housing by a failed standard sealing device. Oil or other fluids can neither be prevented from leaking out of the transmission devices past a worn lip seal. It is not possible to prevent the ingress of contaminants and the egress of lubricating fluids when a differential pressure exists in the sealing devices' surrounding media, such as liquids, gas or dust, between both sides of the sealing device. In both static and dynamic operation, a differential pressure contributes to a leakage of the known seals and supports the transport of contaminants over the barrier of the seals.

An example for a static and dynamic shaft seal assembly is disclosed in U.S. Pat. No. 5,221,095, wherein a solid, circumferentially stretchable annular seal member is mounted on a rotor female surface and engages a stator male surface when the rotor and seal member are at rest. The deformable sealing member is stretched circumferentially in radial direction by centrifugal force out of engagement with the stator when the rotor and seal member are moving at operating speeds, thus eliminating friction of the seal member.

However, although this seal assembly offers protection against rain, product leakage, debris, and wash-down water entering the bearing housing, the disclosed seal assembly does not seal when a pressure difference exists over the shaft seal assembly. The pressure difference may be caused by e.g. a pump effect on the bearing side or by an overpressure on the exterior side. For instance, such an overpressure on the exterior side of the sealing assembly is caused e.g. by cleaning equipment such as high-pressure wash appliances, or if the housing is positioned under water which causes an increased in exterior pressure due to the column of water existing above the housing. The differential pressure may also be generated by temperature variations, e.g. caused by exposure to heat from the sun during the day and cooling during the night, or by heat generated inside the housing by e.g. friction or power dissipation of driving devices. When heated, fluid inside the housing expands and an increased pressure results and vice versa. Such differential pressures cause the known sealing members to be lifted away and to loosen out of mechanical contact with the adjacent sealing surface, which results in a loss of sealing giving way to a passage for contaminants to e.g. a bearing and thus shortening of the product life of the equipment comprising the sealed shaft.

Moreover, the seal assembly disclosed in U.S. Pat. No. 5,221,095 is difficult to assemble as the elastic sealing member has to be positioned against its contracting elasticity into the sealing assembly.

Another shaft sealing assembly is disclosed in CH-369329, wherein an O-ring statically seals a shaft. The O-ring is located in a rotor recess having coaxial walls with a certain inclination angle relative to a radially oriented stator. In this way, the O-ring is by means of its elasticity pressed against a radial stator surface and a sealing effect is achieved. On rotation of the shaft, the O-ring is caused to circumferentially expand due to the centrifugal force experienced. By means of one of the inclined circumferential walls, the O-ring travels further axially and radially away from the stator. Thus, contact friction of the O-ring is eliminated upon rotation of the shaft. This shaft seal assembly is easier to assemble than the previously described assembly disclosed in U.S. Pat. No. 5,221,095. However, this shaft sealing assembly does similarly suffer from the disadvantage that the sealing assembly does not seal when a differential pressure exists in the surrounding media on the two sides of the shaft seal assembly.

Thus, the problem to be solved is to provide a new shaft seal assembly insensitive to differential pressures in the media on both sides of the sealing assembly, ensuring protection against ingress of contaminants and egress of lubricants, both in static and dynamic mode of operation.

Another problem to be solved by the invention is to provide a machinery seal of the type described above, in which a solid sealing member engages both a seal stator and a seal rotor when the shaft is at rest, and in which the sealing member expands away from the stator when the shaft rotates.

Still another problem to be solved by the invention is to provide a seal of the type described above, which provides easy assembly, manufacture and a long product life cycle.

Yet a further problem to be solved by the present invention is to provide a sealing for rotating shafts with large diameters up to approximately 3 m, such as approximately 1 m. Shafts with such large diameters requiring effective static and dynamic sealing are for instance used in water driven turbines in hydro power plants or in propeller shaft sealings of vessels.

Furthermore, the person skilled in the art will be able to identify further problems associated with the prior art, which are not explicitly stated in the text of this application, but which are solved by the present invention.

SUMMARY OF THE INVENTION

The present invention overcomes the above-identified deficiencies in the prior art and solves at least the above-identified problems singly or in any combination by providing a shaft sealing assembly according to the appended patent claims.

The general solution according to the invention is provided by an axial sealing assembly for static and dynamic sealing, preferably of an axial bearing. The assembly includes at least one first resilient elastic sealing member, a centrally located rotating movable shaft, a rotor attached to said shaft, and a stator attached to a housing. The first sealing member is arranged in such a manner that a pressure difference applied over the axial sealing assembly does not degrade sealing performance of said sealing member when sealing statically. The sealing member is located in an annular recess of the rotor and the assembly has the following operating modes: (1) a static operating mode, wherein the central shaft and thus the whole sealing assembly is at rest; (2) a dynamic operation mode, wherein the shaft is rotating at an operating speed; and (3) transition modes occurring between the two previous operating modes when the shaft accelerates from rest or vice versa.

In the static operating mode, the resilient elastic sealing member is effectively sealing one side of the assembly from it's other side when a pressure difference is existing in the media present on the two sides, wherein the sealing effect is supported by the pressure difference, i.e. the pressure pushes the sealing member into its sealing surfaces.

In the dynamic operating mode, the sealing is affected by a pressure difference caused by a turbine effect of the expeller member or members. When transiting from static to dynamic operation, the static sealing member is centrifugally moved axially and radially out from its static sealing position into another position out of contact with the stator by centrifugal force and an under-pressure generated by the expeller sucking the elastic sealing member from the sealing surfaces. Thus, friction between the sealing member and the stator is eliminated during rotation of the shaft.

During the transition from shaft rest to rotation, the sealing is not allowed to leak. This is achieved by an appropriate construction of the elements of the shaft sealing assembly. For instance, it is ensured that the pump effect of the expeller does provide a sufficiently high pressure with relation to the pressure in the surrounding media, such that sealing is ensured at all times.

The present invention has a number of advantages over the prior art. Namely, the present invention provides an easily assembled and manufactured sealing assembly which effectively ensures static and dynamic sealing with a differential pressure present between the two sides sealed from each other, without degrading sealing performance, even at large shaft diameters.

BRIEF DESCRIPTION OF THE DRAWINGS

The detailed description of the invention, contained herein below, may be better understood when accompanied by a brief description of the drawings, wherein:

FIG. 9 is a planar view showing the friction coupling element of FIG. 5 in an assembled and "wedged up" position;

FIG. 10 is a sectional view showing a fluid channel in the axial sealing assembly for fluid distribution of the present invention.

DETAILED DESCRIPTION OF THE PREFERED EMBODIMENT

An exemplary embodiment of the invention is shown in the FIGS. 1 to 4 in order to illustrate the present invention. However, the invention is not limited to this specific embodiment and is only limited by the appended patent claims.

Figure 1:
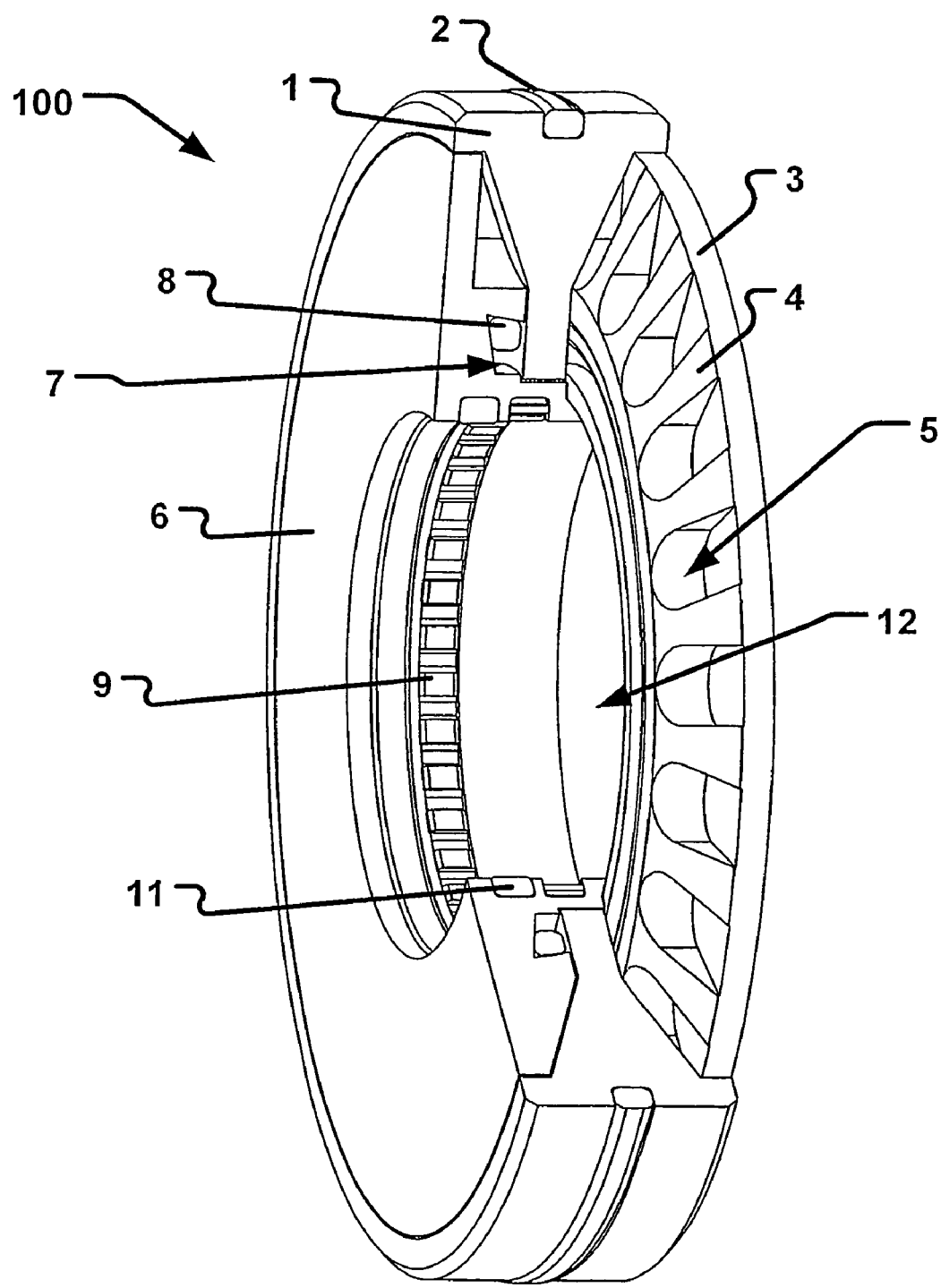
FIG. 1 is a perspective view, partially in section, of an embodiment of a shaft sealing assembly for static and dynamic sealing of a shaft of the present invention.

FIG. 1 shows an embodiment 100 of an axial shaft sealing assembly for static and dynamic sealing of a shaft. The axial sealing assembly comprises a stator member 1, a sealing member 2 sealing the stator member 1 against a surrounding housing, a first expeller rotor member 3 comprising expeller protrusions 4 and in-between lying expeller recesses 5, a second expeller rotor member 6 having an annular recess 7 enclosing an annular sealing member 8, a friction coupling member 9 rotationally locking the axial sealing assembly towards a central shaft, a sealing member 11 sealing along the shaft in longitudinal direction, and a central interior 12 for receiving a rotatably movable shaft mounted in at least one bearing inside the housing. The two expeller rotor members 3, 6 are assembled by means of a press fitting. The rotor and the stator do not physically engage one another and a slit between the stator and the rotor is left open. This slit is a passage from one side of the sealing assembly to the other side. In order to seal off this passage, partly the sealing member 8 is used in rest and partly a centrifugal pumping effect is used in motion of the shaft.

In dynamic operation, as described in more detail below, expeller rotor members 3, 6 generate a pressure difference in the slit passage upon rotation of the shaft and the expeller rotor members 3, 6. The pressure difference is generated by centrifugal forces expelling any loose material or medium, such as loose particles, liquids, gases, dust, etc. inside the slit and out of the slit. This is caused by the rotational movement of the expeller rotor members in connection with the wing-like shape of the expeller protrusions and recesses, whereby any material having entered the slit is exposed to an expeller pumping pressure caused by centrifugal forces slinging the material back and expelling it out of the same slit. The expeller rotor members 3, 6 comprising expeller protrusions 4 and in-between lying expeller recesses 5, are appropriately shaped in order to create a pressure sufficient to resist the highest differential pressure, which may be expected during operation of the sealing assembly 100 between the two sides of the assembly 100. By shaping expeller rotor members 3, 6 to have a wing-like shape, the pressure is balanced, i.e. the pressure generated by the turbine effect of the rotating wings compensates for the pressure outside of sealing assembly 100 by "pumping back" the external pressure, thus ensuring effective sealing at all operating conditions.

Sealing assembly 100 has the following operating modes: (1) a static operating mode, wherein a central shaft 10 (shown in FIG. 2) and thus the whole sealing assembly 100 is at rest; (2) a dynamic operation mode, wherein shaft 10 is rotating at an operating speed; and (3) transition modes between the two previous stated operating modes wherein shaft 10 accelerates from rest or vice versa.

In the static operating mode, annular sealing member 8 is effectively sealing one side of the assembly 100 from its other side. In the dynamic operating mode, the sealing is affected by a pressure difference caused by a turbine effect of the expeller members 3, 6. Annular sealing member 8 is centrifugally moved axially and radially outward, away from of its static sealing position into another position out of contact with stator 1. Thus friction between sealing member 8 and stator 1 is eliminated during rotation of shaft 10.

In the dynamic operation mode, when shaft 10 and expeller rotor members 3, 6 are rotating, any material entering into the passage opened by sealing member 8, is immediately expelled out by the expeller centrifugal pumping effect, as described above. Thus also material, contaminants etc., which have entered the slit during a static sealing period and which have accumulated in the slit passage, e.g. in the expeller recesses 5, are expelled during the transition from the static to dynamic sealing operation. Any material entering the slit during dynamic sealing operation will be expelled immediately. The longer the material enters the slit, the higher the centrifugal force will be for expelling the material back out of the same slit and out of assembly 100 on a respective side thereof.

Figure 2:
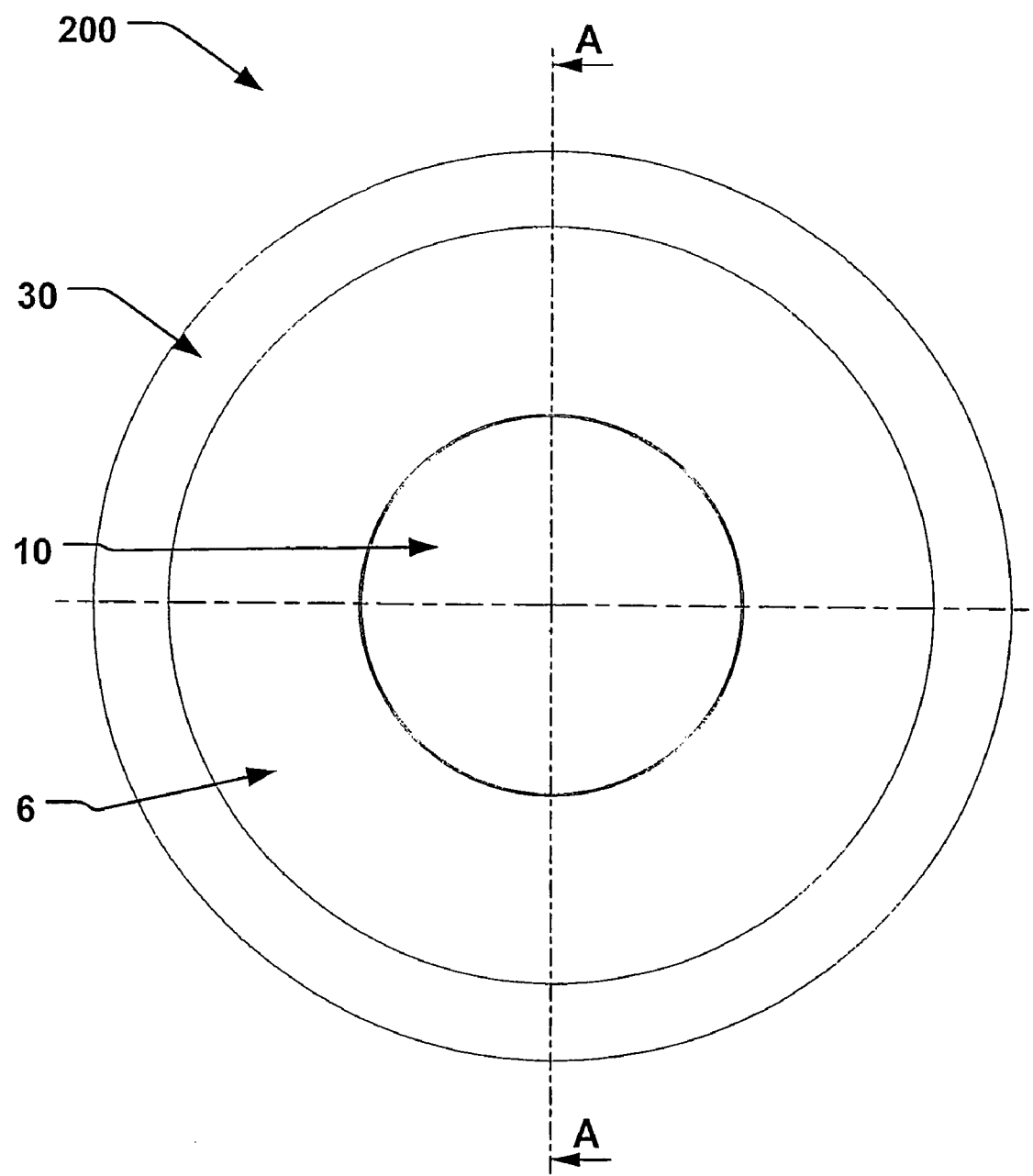
FIG. 2 is a frontal planar view showing an axial sealing assembly of FIG. 1 in a housing.

In the frontal planar view of FIG. 2, an assembly 200 of the axial sealing assembly 100 of FIG. 1 is shown arranged in a housing 30. The parts of the axial sealing assembly 200 visible in FIG. 2 are the housing 30 partly overlapping second expeller rotor member 6 and central shaft 10.

Figure 3:
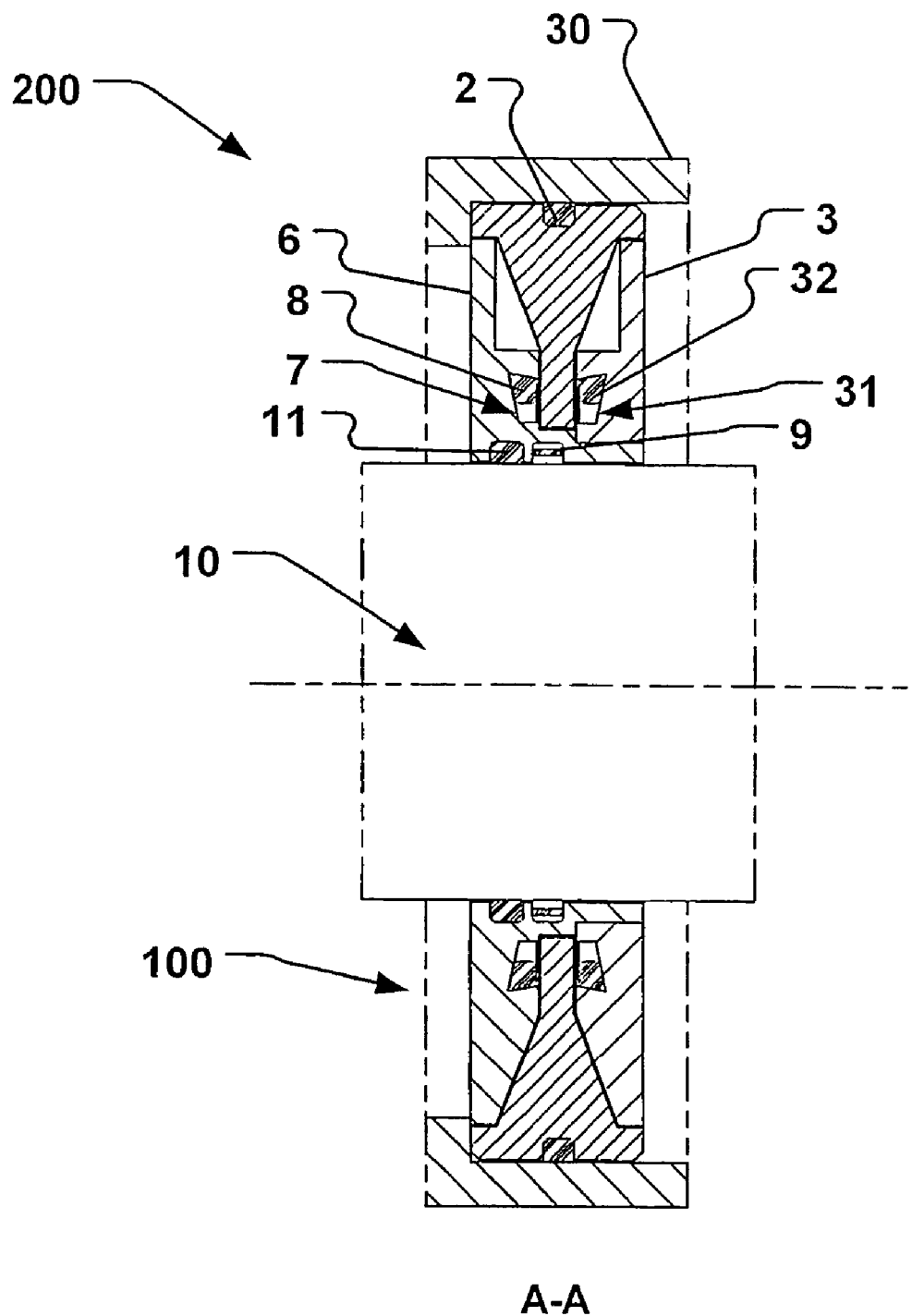
FIG. 3 is a cross sectional view along line A-A shown in FIG. 2, illustrating the axial sealing assembly of FIG. 1 built in a housing and with a shaft.

FIG. 3 is a cross sectional view taken along line A-A shown in FIG. 2, illustrating the axial sealing assembly 100 of FIG. 1 built in housing 30 with shaft 10. Furthermore, a recess 31 in first expeller rotor member 3 enclosing a further annular sealing member 32 is shown.

Figure 4:
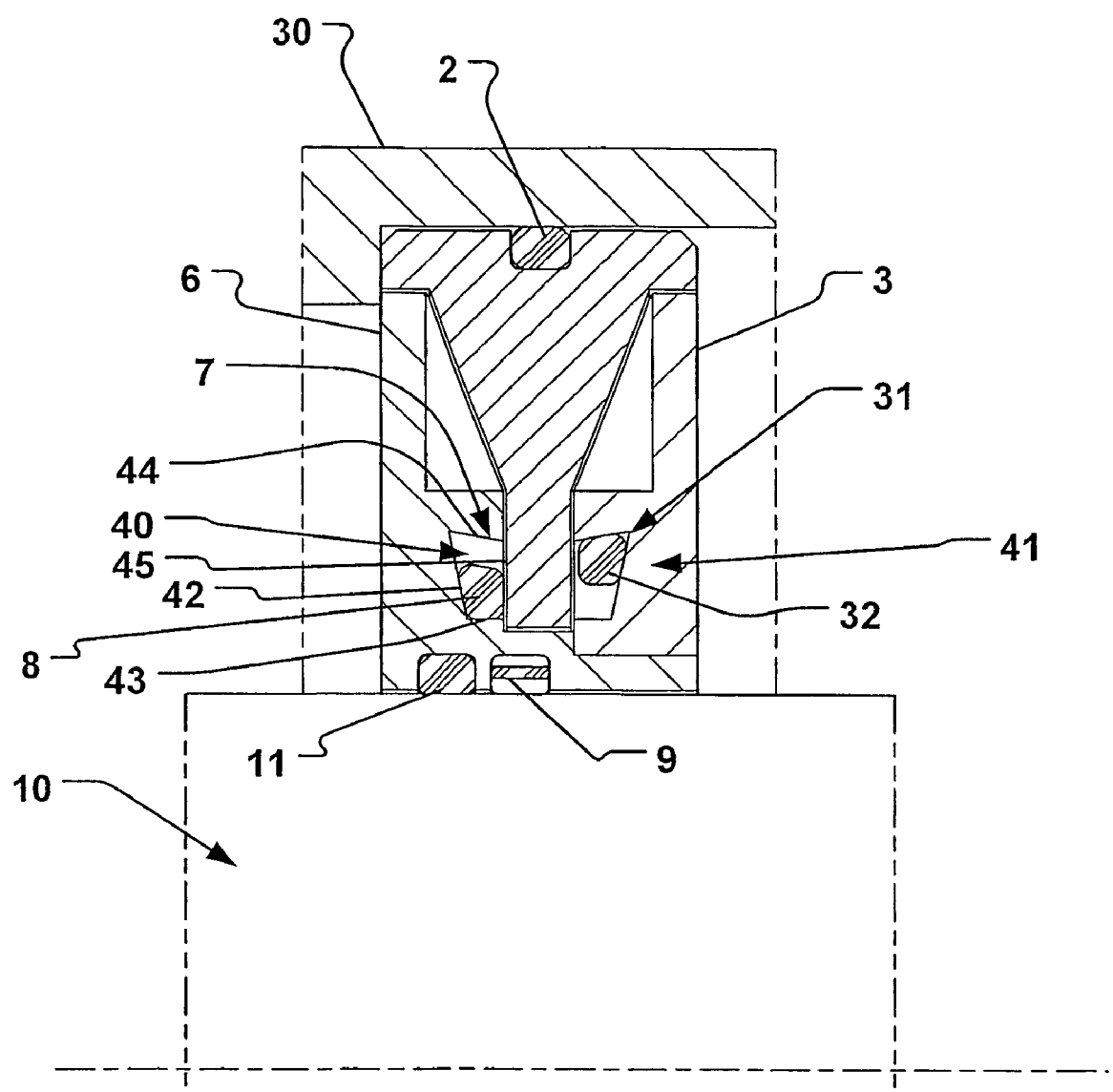
FIG. 4 is an enlarged cross sectional view of the embodiment of FIG. 1, illustrating static and dynamic sealing of the axial sealing assembly.

FIG. 4 is an enlarged cross sectional view of the embodiment of FIG. 1, illustrating static and dynamic sealing of the axial sealing assembly. An arrow 41 indicates the dynamic sealing operation mode, wherein annular sealing member 32 is drawn into the radially outward position of recess 31 out of contact with the stator 1 by centrifugal force of the assembly rotating at operational speed of the shaft 10. An arrow 40 indicates the static sealing operating mode, wherein the annular sealing member 8 is shown in the radially inward position of recess 7. The sealing member 8 is drawn into this position by the elastic force of sealing member 8. The recess 7 comprises a first radially inclined recess surface 42 bridging a second axially oriented radially inward positioned recess surface 43 and a third axially inclined oriented radially outward positioned recess surface 44. Surface 42 is inclined radially away from radially oriented surface 45 of the stator 1 from its axially inward end to the axially outward end, as shown in e.g. FIG. 4.

Sealing member 8 does not only seal by its elastic force. A pressure difference between the exterior (on the left in FIG. 4) and the interior (on the right in FIG. 4) influences the sealing effectiveness of sealing member 8. The higher the pressure applied on the exterior side, the better sealing effect is achieved in the static operation mode, as the pressure forces the sealing member 8 axially downwards and thus towards both the second axial surface 43 and a lower part of inclined recess surface 42 of annular recess 7 in rotor member 6 as well as against radially oriented surface 45 of stator 1 adjacently facing recess 7. Respectively, the same is true for sealing member 32, in case a higher pressure is applied on the interior side.

The recess 7 in the rotor 6 is shaped in such a manner that a pressure difference over the seal assembly in the static operation mode improves sealing of the sealing member 8. This is due to the fact that the sealing member 8 is supported by the pressure, i.e. the pressure actively presses the sealing member into the sealing contact surfaces. The physical seal engagement occurs also between sealing member 8 and stator 1 along a radially extending surface of stator 1.

During the transition from static to dynamic sealing, sealing member 8 is moved from the radially inward static position as indicated by arrow 40 to the radially outward position as indicated by arrow 41. The movement is caused both by centrifugal force and by a pressure difference caused by the rotating expeller accomplishing a pumping effect, which sucks the sealing member 8 radially outwards.

Thus, it is ensured that sealing member 8 effectively seals statically when the shaft 10 is at rest. Furthermore, the sealing assembly effectively seals dynamically when shaft 10 is rotating at an operating speed due to the pressure difference caused by expeller rotor members 3 and 6. Friction is eliminated in the dynamic operation mode because sealing member 8 moves out of contact with stator 1, as explained above. Furthermore, the static and dynamic sealing is effective at pressure differences over the sealing arrangement.

In the embodiment discussed, first radially inclined recess surface 42 of annular recess 7 in rotor member 6 has an inclination angle of approximately between 10° and 20°, and preferably of approximately 12°. However, also inclination angles of more than 20° may be used without departing from the present invention.

The cross-sectional shape of annular sealing member 8 may be circular, i.e. annular sealing member 8 preferably is toroidal O-ring with circular cross-section. However, annular sealing member 8 may also have different forms and shapes as e.g. shown in the Figures, i.e. substantially rectangular with rounded corners or an oval shape.

The material of sealing member 8 is chosen such that it has a sufficient sealing effect against the sealing surfaces, that it is sufficiently resiliently deformable to move from the static position to the dynamic position and back, that friction is low during transition from the static to the dynamic position, i.e. during the start-up of shaft 10, and when sealing member 8 still is in contact with the stator static sealing surface. Suitable materials for sealing member 8 are e.g. rubber, Viton®, FKM, FFKM, EPDM, etc. Suitable materials for the remaining elements of sealing assembly 100 are, for instance, metallic materials such as bronze or stainless steel, also elastomeric materials, especially for large shaft diameters, as well as synthetic materials such as acrylic plastic, PU or PA.

For large shaft diameters and thus for corresponding large shaft sealing assemblies, the elements of sealing assembly 100 may be manufactured as continuous elongated elements, which may be pre-assembled and fit around a shaft to a unit as shown in FIG. 1. Alternatively, the elements of sealing assembly 100 may be manufactured as partly assembled or as separate parts, which are to be assembled on site on the shaft. The rotor, stator and sealing member may be manufactured by extrusion and assembled on site by sealing together the extruded parts to annular elements on site. This has the advantage that sealing assemblies for large diameter shafts are easily manufactured and assembled on the shaft, both at low cost and by providing an effective sealing of the sealing assembly.

The embodiment shown in FIGS. 1 to 4 has recesses 7, 31 enclosing sealing member 8, 32 in each rotor 3, 6. In this way, the sealing works with pressure differences in both ways, i.e. either over-pressure outside or inside the housing. However, for certain applications it may be sufficient to ensure sealing into one pressure difference direction. In this case, one recess and sealing member may be omitted. The embodiment according to FIGS. 1 to 4 is preferably assembled to a complete cartridge, ready to fit into the space for the shaft sealing device.

Figures 5, 6:
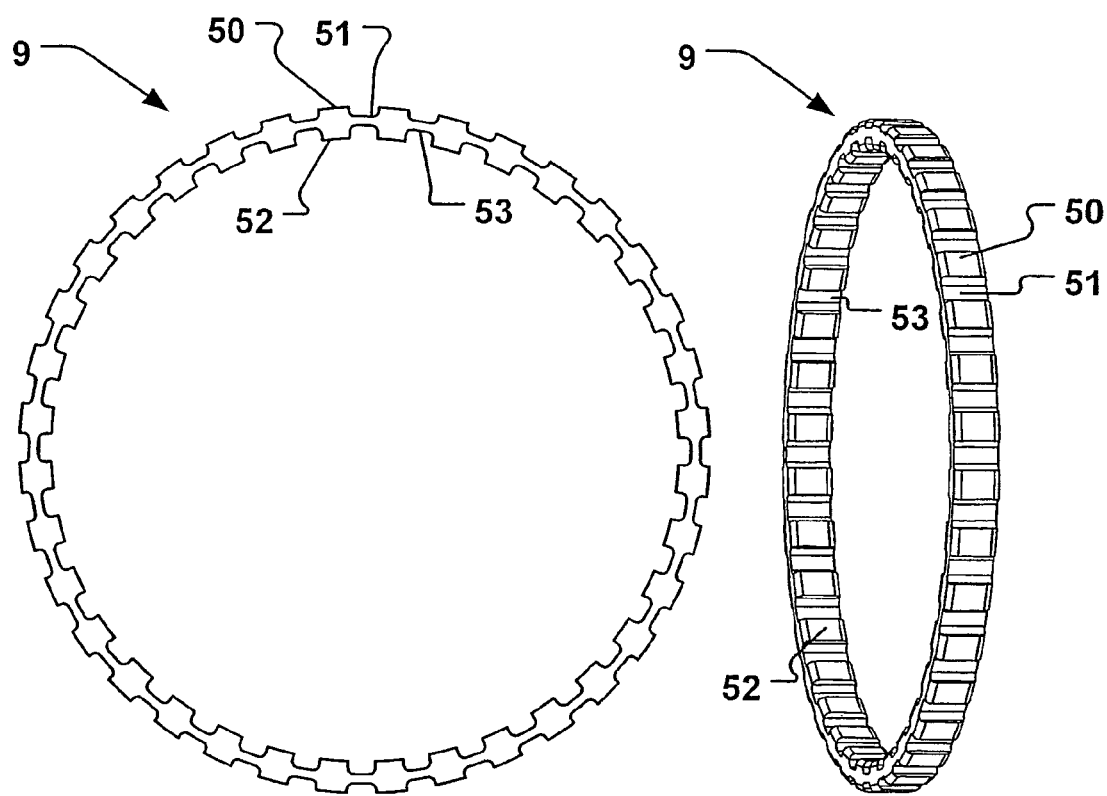
FIG. 5 is a planar view showing a friction coupling member of the embodiment as shown in FIG. 1.
FIG. 6 is a perspective view showing the friction coupling of FIG. 5.

Now the attention is drawn to FIGS. 5 and 6 in combination with previously discussed FIGS. 1 through 4. The sealing assembly 100 is assembled with the shaft 10 by means of slipping the sealing assembly over the shaft 10. A sealing member 11 seals the two sides of the sealing assembly, i.e. the gap between the shaft 10 and the expeller seal assembly 100. A problem associated with the previous is that the sealing assembly moves relative to the shaft due to inertia of two parts relative to each other. This means that the sealing member 11 is subjected to frictional movement and wears out after a number of start-stop-cycles. This problem is solved by using a friction coupling member 9 inserted into a groove in parallel with the sealing member 11, as shown in the FIG. 1. Another problem solved by the friction coupling member 9 is that a much larger torque may be transmitted between the shaft 10 and the rotor member 3, 6. Thus, it is possible to transfer a much higher torque from the shaft 10 to the rotor members 3, 6 than with only an O-ring sealing 11.

The friction coupling member 9 of the embodiment is shown in more detail in FIGS. 5 and 6. According to the embodiment, the friction coupling member 9 is an annular belt-like flattened ring having protrusions 50, 52 as well as recesses 51, 53 on both sides. Friction coupling ring 9 works as a breaking element in both rotational directions of shaft 10, breaking and stopping movement of assembly 100 relative to shaft 10. The friction coupling works according to the principle that protrusions 50, 52 will tilt due to the small relative movement between the rotors 3, 6 and the shaft 10. If friction coupling member 9 is manufactured from a resilient material, such as hard rubber, this tilting movement will compress the resilient material of the friction coupling at adjacent protrusions 50, 52 of the friction coupling 9 and due to increased friction and increased local contact pressure at the contact surfaces of friction coupling member 9 to shaft 10 and rotor members 3 and 6, the relative movement will be slowed down and stopped. Alternatively, the friction coupling member 9 is made of a little compressible material, such as metal, preferably stainless steel. In this case an even hard and more instantaneous break effect is achieved due to the choice of material and due to the fact that the coupling effect is achieved faster. Thus, independent of the material of the friction coupling member, a more intense connection of the shaft 10 and the rotors 3 and 6 of sealing assembly 100 is achieved in the currently discussed "break" position. The only way to loosen this coupling connection is to rotate shaft 10 in the reversed direction, so that the tilting is reversed. However, even in this direction, a tilting will occur in the other direction and the friction coupling 9 will hinder and stop relative movement. If friction coupling member 9 is made of metal, a resilient spring effect may support the above described coupling process. The spring effect may be built into the friction coupling element 9 by appropriately choosing a material and shape so that the spring effect is oriented against the relative movement between shaft 10 and rotor members 3 and 6.

The torque actuating from shaft 10 on rotors 3 and 6 and vice versa may be increased by e.g. an increased pump effect of the expeller wings in order to withstand differential pressures as described above, or by an extra pump effect for e.g. an oil mister, as described below, integrated in to the sealing assembly 100. The higher the torque is, which actuates on rotor members 3 and 6, the harder the elements of the friction coupling will be pressed together and the higher the wedge effect on the friction coupling. Thus, torque is more effectively transmitted from shaft 10 to rotor members 3 and 6 without degrading sealing member 11 in an axial direction, thereby providing enhanced product life of sealing member 11 and thus the whole sealing assembly. However, the friction coupling member 9 does permit a certain movement which might be desired, for instance, for rotors 3 and 6 to dynamically adjust to the position of stator 1.

Figure 7:
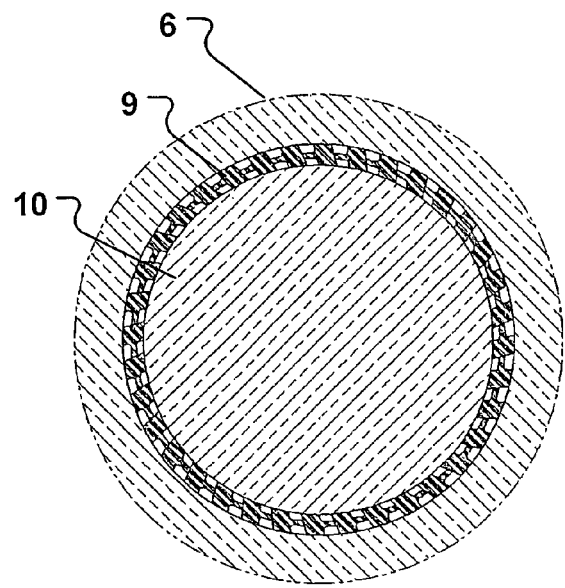
FIG. 7 is a sectional view showing a shaft, a rotor and the friction coupling element of FIGS. 5 and 6 interposed between the shaft and the rotor, wherein the friction coupling element is in rest.
Figure 8:
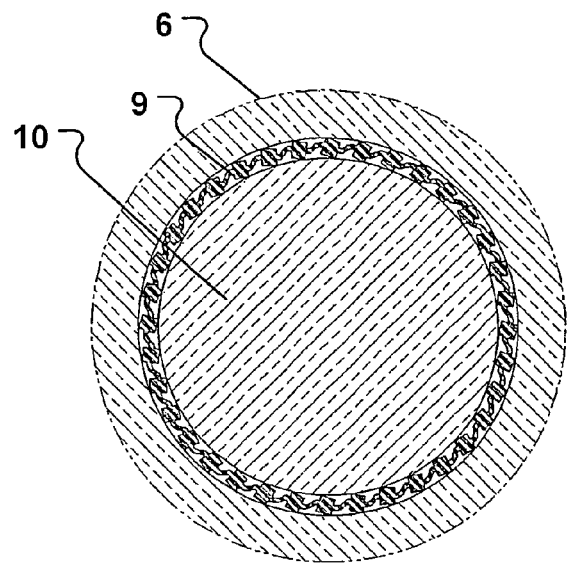
FIG. 8 is a sectional view similar to FIG. 7, wherein the friction coupling element is clamped up.

FIGS. 7 and 8 illustrate the above described friction coupling function. Friction coupling member 9 is shown interposed between a shaft 10 and rotor member 6, wherein friction coupling element 9 is in rest, i.e. there is no differential torque between the shaft 10 and rotor member 6. In FIG. 8, friction coupling element 9 is "clamped up" due to a differential torque between the shaft 10 and rotor member 6, as described above.

The person skilled in the art will understand that the shape of friction coupling member 9 shown in the figures is only one of several for achieving the above described effect. For instance the friction coupling member 9 shown in FIGS. 7 and 8 differs from the friction coupling member 9 shown in FIGS. 5 and 6, but fulfils the same function, as described above.

Figure 11:
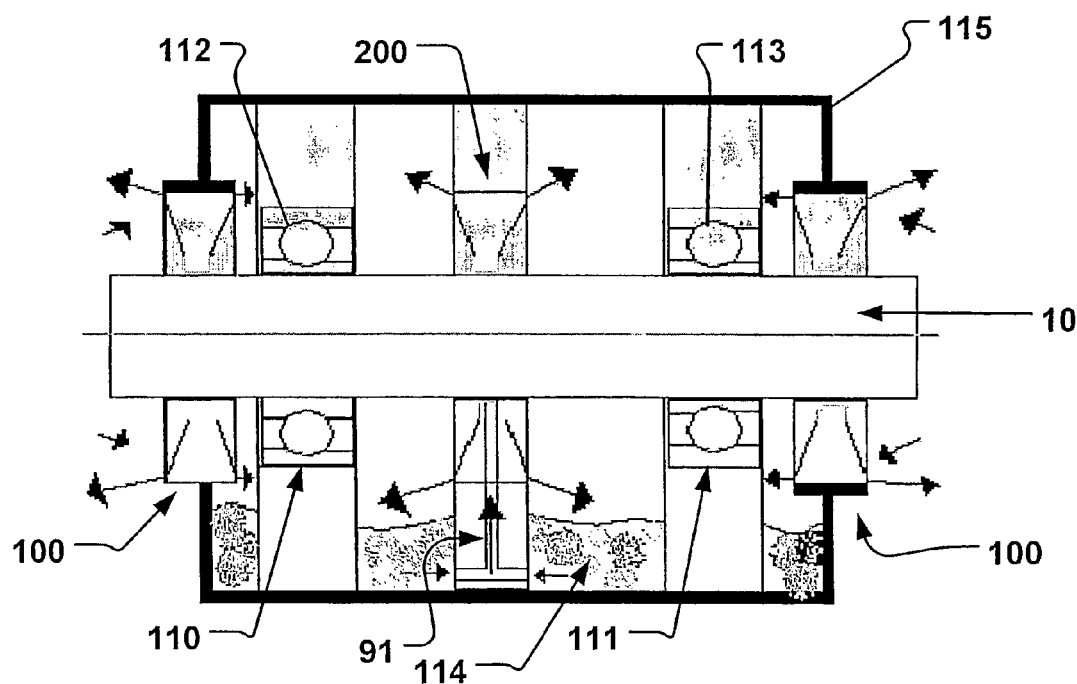
FIG. 11 is a schematic sectional view illustrating a bearing box with two shaft sealings according to the embodiment of FIG. 1 and one shaft sealing as an oil mister.

According to another embodiment, a shaft sealing assembly 200 is shown in FIGS. 9 and 10, wherein a radially-inwardly extending bore 91 is located at a bottom of stator 1. The bore 91 communicates with an interior of sealing assembly 200 and an interior of housing 30. In the static operation mode, sealing member 8 acts as a non-return valve, which opens in the dynamic operation mode. FIGS. 9 and 10 show the dynamic operation mode, wherein bore 91, acting as a fluid channel, is open for fluid communication. In this embodiment, bore 91 is connected to a fluid connector 90, which e.g. leads to a fluid reservoir (not shown). Alternatively bore 91 is in direct communication with the housing interior, in which a bearing is located. This might be the case, when the shaft sealing assembly 200 is built-in inside a housing, with e.g. two ball bearings on the two sides sealed off by shaft sealing assemblies 100, as illustrated in FIG. 11. In this case, e.g. the re-condensed oil mist is re-circulated through bore 91, minimizing fluid consumption. Here, even a filter may be interposed into bore 91 (the fluid channel) in order to clean the re-circulating liquid. During dynamic operation, a fluid is sucked through bore 91 to the interior of sealing assembly 200 and expelled out of and away from sealing assembly 200. This is detailed and illustrated in FIGS. 10 and 11, wherein arrows 92 to 96 indicate a fluid path in the exemplary embodiment. The arrows in FIG. 11 indicate partly an exterior pressure outside the bearing box 115, partly the expelled oil 114 from expeller members in assembly 200 and partly the oil flow through bore 91 into the interior of assembly 200, from where it is expelled out through the slit in assembly 200, similar to the slit explained above in connection with FIG. 1 to 4. Thus, bearings 110 and 111 having bearing balls 112 and 113, are effectively lubricated on rotation of the shaft 10 by the generated oil mist. Furthermore, the assembly is efficiently sealed against a pressure outside of bearing box 115 both with the shaft rotating, as shown in FIG. 11 and with the shaft at rest by static sealing members in assemblies 100.

In this way, an effective oil-mist generation is assured, without the need for expensive compressor systems generating the pressure needed for pressing the fluid through a channel and an ejector-nozzle. The necessary pressure is delivered by the integrated expeller rotor members 3, 6 upon rotation.

The fluid may be a cleaning liquid cleaning away any material which might have accumulated in recesses 5 of the expeller rotor members 3 and 6. Alternatively, the fluid may be a lubrication liquid, such as oil, which is used for lubricating one or more bearings. In this case the oil is transformed into an oil mist by the centrifugal force throwing out small oil droplets from expeller rotor members 3, 6 to the exterior of sealing assembly 100. When the sealing assembly is used inside a housing having bearings on both sides of a sealing assembly, the assembly is used for spreading lubricating fluid to the bearings, thus enhancing the product life of the bearings. The liquid may come from a separate container (e.g. for cleaning fluid) or it may come from a fluid bath on the bottom of assembly 100. By using the bore, the spreading is much more effective than by just centrifugally throwing out a fluid in the case of the bottom of the expeller wheels immersed in a fluid bath.

Alternatively to the shown embodiment of the fluid channel, the distribution of liquid to both sides of the shaft sealing assembly 100 can be affected by arranging bore 91 such that fluid is only distributed to a rotor member on one side of the shaft sealing. Thus fluid will only be distributed to this one side.

Alternatively to the embodiment shown in the Figures, the shaft sealing may be integrated directly with a bearing of the shaft. In this case, a rotor is coupled to an inner bearing ring, such as a ball bearing, being coupled to the shaft. An expeller rotor member is directly joined to the inner bearing ring and a stator member is directly joined to the outer bearing housing. In this way a very compact solution is achieved.

In yet another alternative embodiment, the shaft sealing assembly includes only one rotor member with a sealing member in a recess as previously described. In this case, the assembly does seal effectively for a differential pressure in one direction, which is sufficient for certain applications.

Also, rotor members 3, 6 shown as different constructed elements may be identical and attached to each other by e.g. gluing at axial contact surfaces.

Applications and use of the above described shaft sealing according to the invention are various and include exemplary fields such as pumps in the offshore oil and gas industry, mining industry, pulp and paper industry, underwater pumps, water driven turbines in hydro power plants, propeller shaft sealings of vessels, etc. The present invention has been described above with reference to specific embodiments. However, other embodiments than the above are equally possible within the scope of the appended claims, e.g. different shapes of the rotor or stator, other elastic materials for the sealing member than those described above, to just name a few.

Furthermore, the term "comprises/comprising" when used in this specification does not exclude other elements or steps, the terms "a" and "an" do not exclude a plurality and a single processor or other units may fulfill the functions of several of the units or circuits recited in the claims.

Equivalent elements can be substituted for ones set forth herein to achieve the same results in the same way and in the same manner.

Having thus described the present invention in the detailed description of the preferred embodiment, what is desired to be obtained in Letters Patent is:

1. A shaft sealing assembly for static and dynamic axial sealing of a centrally located rotatably moving shaft, the shaft sealing assembly comprising:
   a) at least one sealing member sealing said shaft;
   b) at least one rotor member attached to said shaft;
   c) a housing surrounding said at least one rotor member and said shaft;
   d) a stator member attached to said housing;
   e) said at least one sealing member positioned in a recess in said at least one rotor member and adapted to maintain sealing performance of said sealing, during statical sealing, without degradation thereof, caused by a differential pressure present in an axial direction between media disposed on two sides of said shaft sealing assembly;
   f) said at least one sealing member being arranged to statically seal against a substantially radially oriented surface of said stator member, a substantially radially oriented surface of said recess and a substantially axially oriented surface of said recess, such that said dynamic axial sealing is achieved on rotation of said shaft by said at least one rotor member; and
   g) said at least one sealing member being configured to move axially and radially away from a static sealing position on rotation of said shaft.

2. The shaft sealing assembly according to claim 1, wherein said at least one rotor member comprises at least one expeller rotor member adapted to generate a pressure for said dynamic axial sealing and for compensating said differential pressure, said at least one expeller positioned adjacent to said stator member and causing said dynamic axial sealing on rotation of said shaft.

3. The shaft sealing assembly according to claim 2, wherein said at least one rotor member includes a plurality of juxtaposedly positioned expeller protrusions and expeller recesses oriented towards said stator member for causing said dynamic axial sealing.

4. The shaft sealing assembly according to claim 3, wherein each said expeller recess is an annular recess formed in said at least one rotor member, said at least one first sealing member enclosed within said plurality of expeller recesses, said plurality of expeller recesses arranged to face said substantially radially oriented surface of said stator member.

5. The shaft sealing assembly according to claim 4, wherein each annular recess has a first substantially radially inclined annular recess surface bridging a second substantially axially oriented radial inwardly positioned annular recess surface and a third substantially axially inclined oriented radial outwardly positioned annular recess surface.

6. The shaft sealing assembly according to claim 5, wherein said at least one sealing member, for said static axial sealing, seals statically against said first substantially radially inclined annular recess surface, said second substantially axially oriented radial inwardly positioned annular recess surface and said substantially radially oriented surface of said stator member, such that said differential pressure causes a supporting sealing pressure of said at least one sealing member on said surfaces.

7. The shaft sealing assembly according to claim 3, wherein a radial inwardly formed channel in said sealing assembly extends therethrough permitting a fluid communication from a bottom portion of said stator member, said channel being in fluid communication with an interior portion of said sealing assembly and an interior of said housing.

8. The shaft sealing assembly according to claim 7, wherein said channel transports a fluid, said fluid expelled out and away from said at least one expeller rotor member during rotation of said shaft.

9. The shaft sealing assembly according to claim 8, wherein said fluid is a cleaning fluid for expelling material from said plurality of expeller recesses and from said sealing assembly during rotation of said shaft, said material accumulating in said plurality of expeller recesses during said static sealing of said sealing assembly.

10. The shaft sealing assembly according to claim 8, wherein said fluid is a lubricant.

11. The shaft sealing assembly according to claim 10, wherein said lubricant is oil, said oil being converted to an oil mist when expelled from said sealing assembly.

12. The shaft sealing assembly according to claim 1, wherein said at least one rotor member comprises a first and second expeller rotor member separated by said stator member.

13. The shaft sealing assembly according to claim 1, wherein said at least one sealing member is made from a resilient elastically deformable material.

14. The shaft sealing assembly according to claim 1, wherein said shaft sealing assembly encloses at least one bearing.

15. The shaft sealing assembly according to claim 14, wherein said shaft sealing assembly-integrates with said at least one bearing.

16. The shaft sealing assembly according to claim 1, further comprising a friction coupling member interlockingly positioned between said shaft and said at least one rotor member.

17. The shaft sealing assembly according to claim 16, wherein said at least one rotor member includes an annular radial recess for receiving said friction coupling member.

18. The shaft sealing assembly according to claim 16, wherein said friction coupling member is arranged such that a torque causing relative rotational movement between said shaft and said at least one rotor member induces compression of said friction coupling member and an increase in friction between said shaft and said at least one rotor member, such that braking occurs on said relative rotational movement.

19. The shaft sealing assembly according to claims 16, wherein said friction coupling member has an annular ring shape and a plurality of alternating adjacently positioned protrusions and recesses.

20. The shaft sealing assembly according to claim 1, wherein said shaft has a diameter of up to 3 meters.

21. The shaft sealing assembly according to claim 1, wherein said at least one rotor member, said stator member and said at least one sealing member are manufactured from an extruded elastomeric material.

22. A method of statically and dynamically sealing a shaft sealing assembly, the steps of the method comprising:
   a) providing at least one sealing member for sealing said shaft;
   b) providing at least one rotor member attached to said shaft, said at least one rotor member having at least one recess, said at least one recess having a substantially radially oriented surface;
   c) providing a housing for surrounding said at least one rotor member and said shaft;
   d) providing a stator member attached to said housing; said stator member having a substantially radially oriented surface;
   e) positioning said at least one sealing member in said at least one rotor member, wherein said at least one sealing member is adapted to maintain sealing performance of said sealing during static sealing, without degradation thereof, by a differential pressure present in an axial direction between media on opposing sides of said shaft;
   f) arranging said at least one sealing member to statically seal against a substantially radially oriented surface of said stator member, a substantially radially oriented surface of said recess and a substantially axially oriented surface of said recess, such that said dynamic axial sealing is achieved on rotation of said shaft by said at least one rotor member; and
   g) configuring said at least one sealing member to centrifugally move axially and radially away from a static sealing position on rotation of said shaft.

23. The method according to claim 22, further comprising the step of eliminating friction between said at least one sealing member and said stator during dynamic sealing by the step of centrifugally moving said at least one sealing member on rotation of said shaft.

24. The method according to claim 23, further comprising the steps of:
   a) affecting said dynamic sealing by a dynamic rotor pressure difference caused by a turbine effect of said at least one rotor member; and
   b) compensating said differential pressure present in said axial direction between media on said opposing sides of said shaft with said dynamic rotor pressure difference, thereby maintaining sealing during said dynamic operation.

* * * * *